Figure 1:
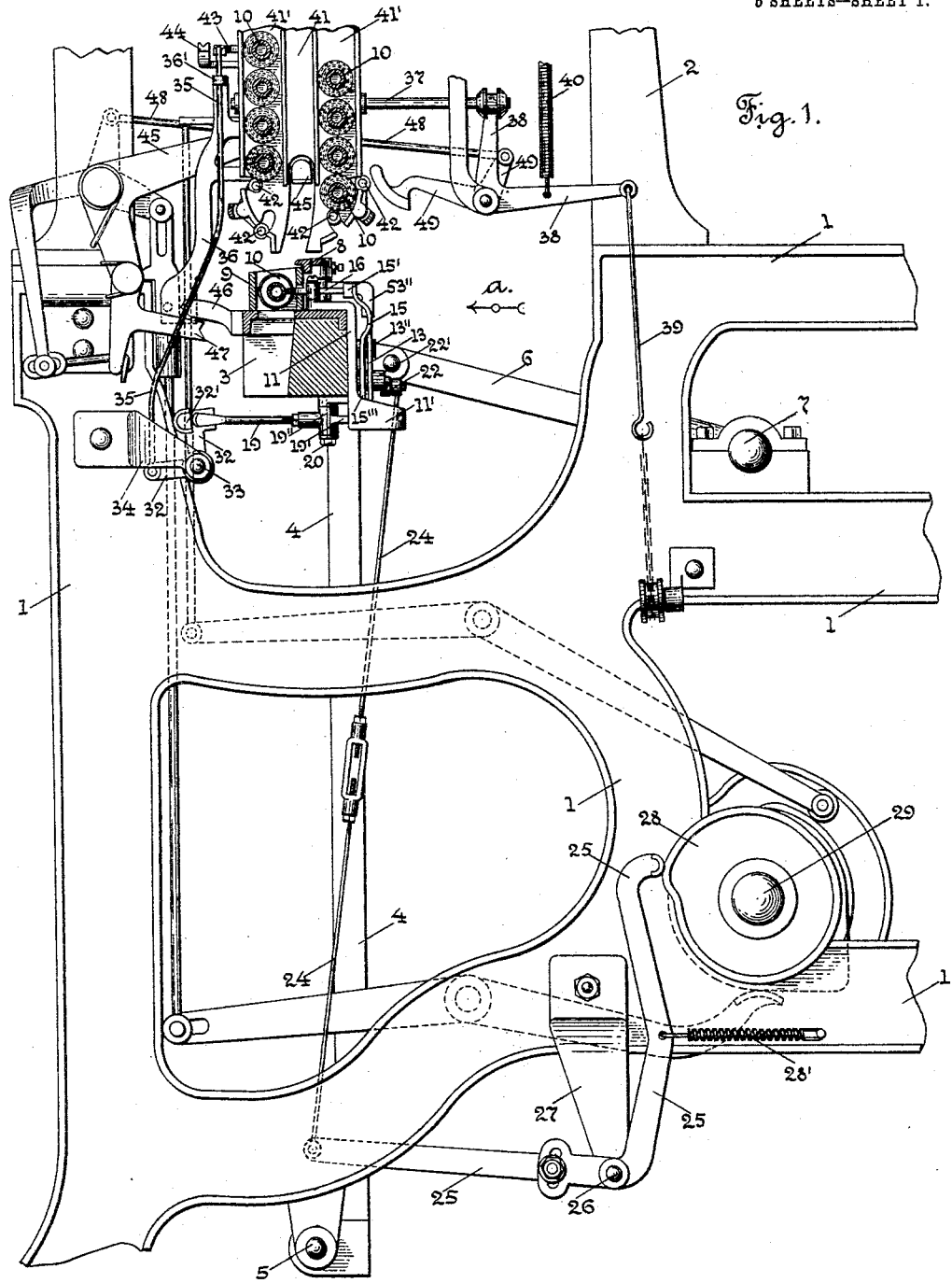

L. B. JENCKES & G. F. HUTCHINS.
WEFT REPLENISHING LOOM.
APPLICATION FILED MAY 29, 1908.
932,134.
Patented Aug. 24, 1909.
5 SHEETS—SHEET 2.
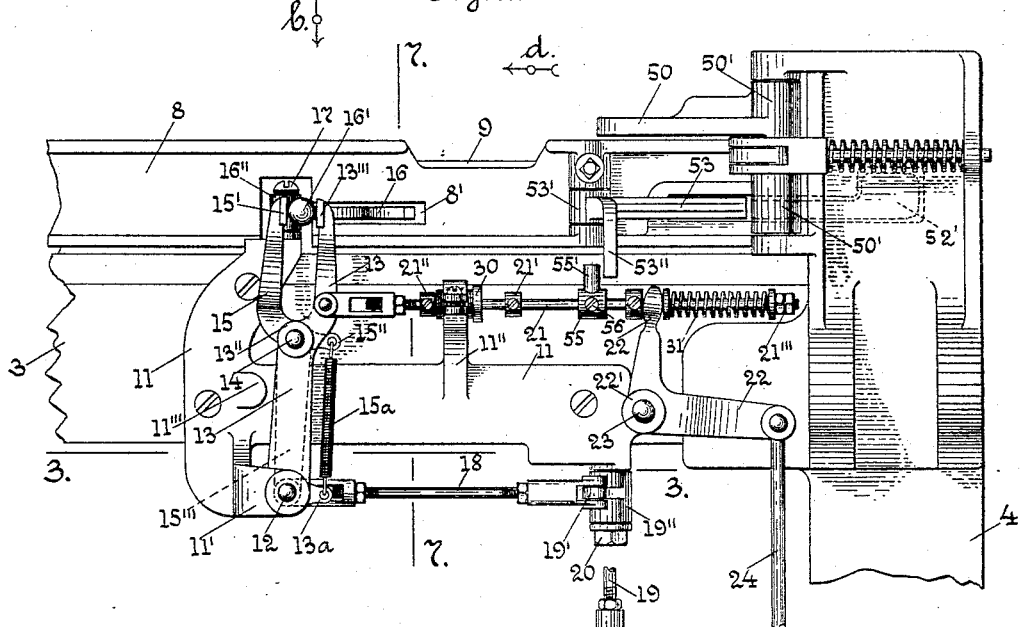
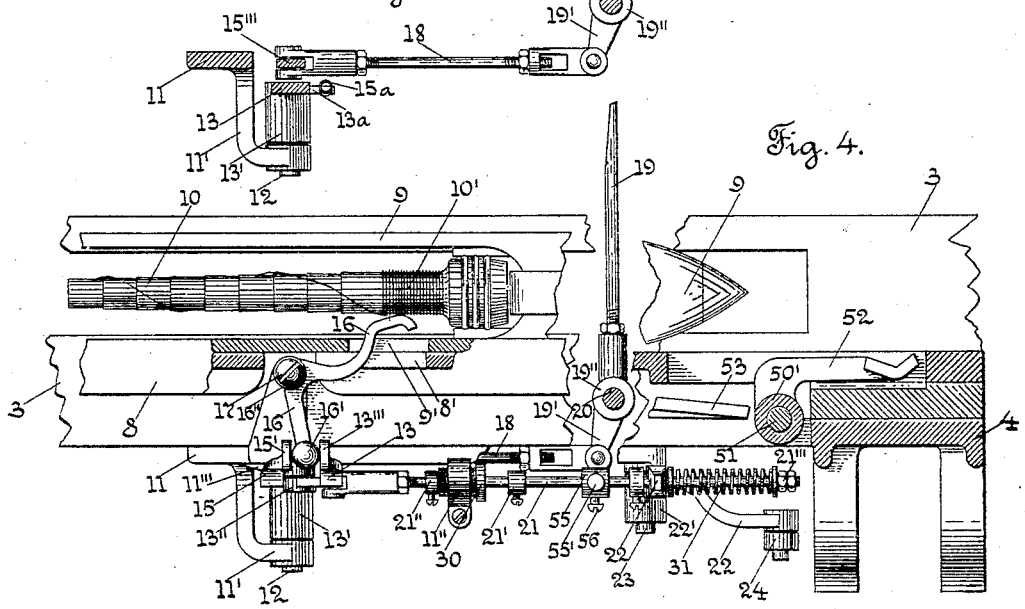
Witnesses
M. Bredt.
W. Haas
Inventors
George F. Hutchins,
Lawrence B. Jenckes.
By John C. Dewey, Attorney.

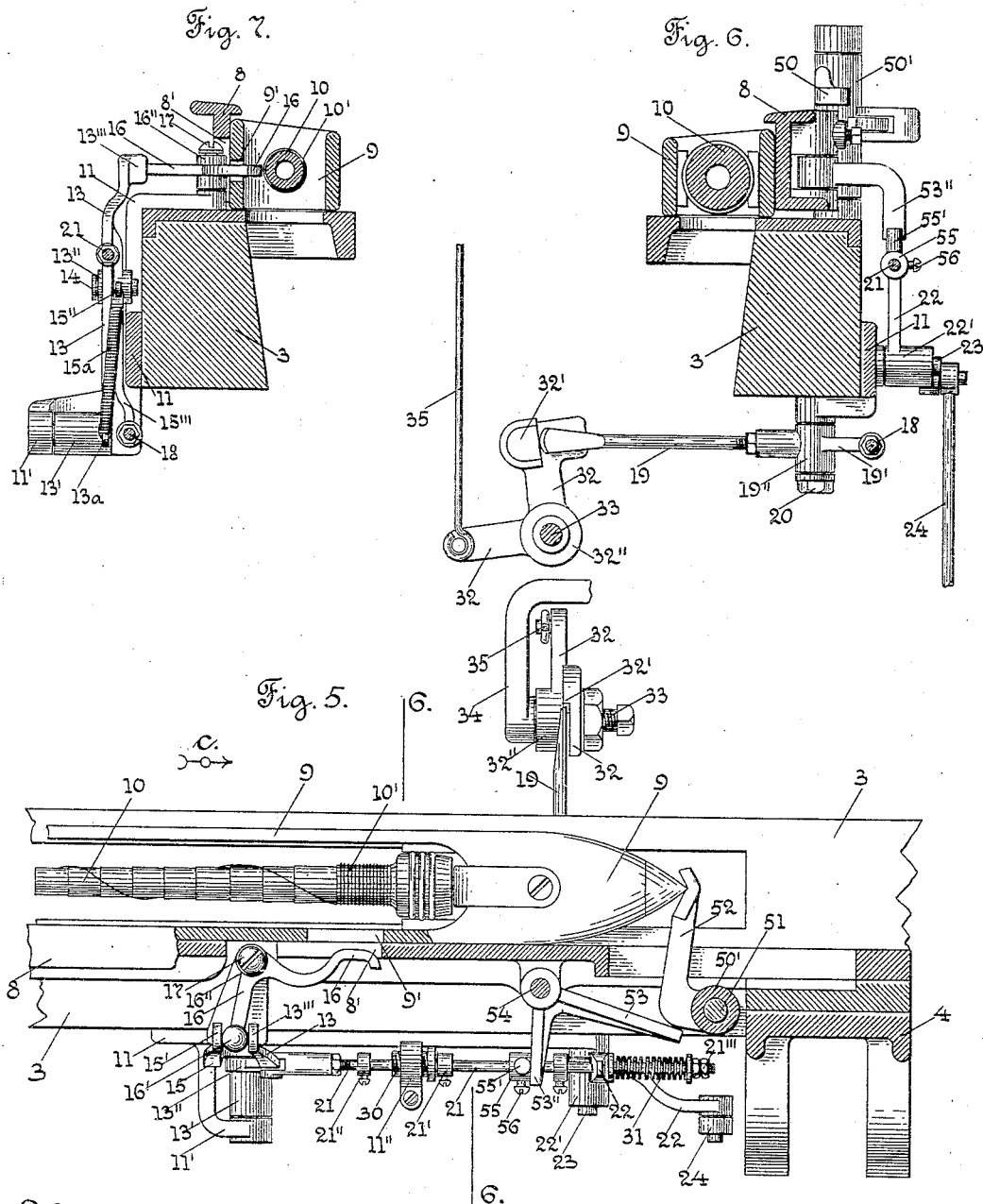

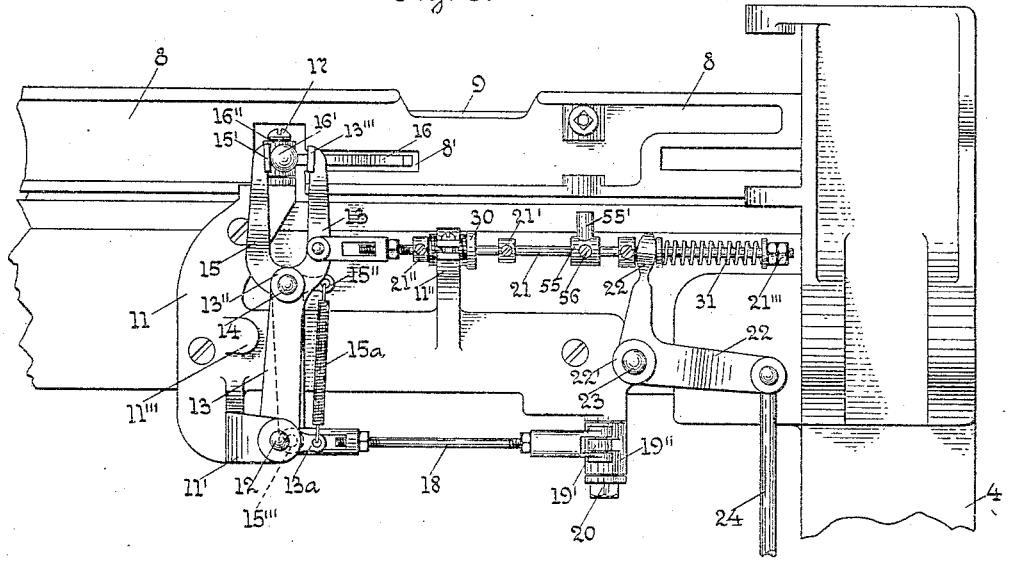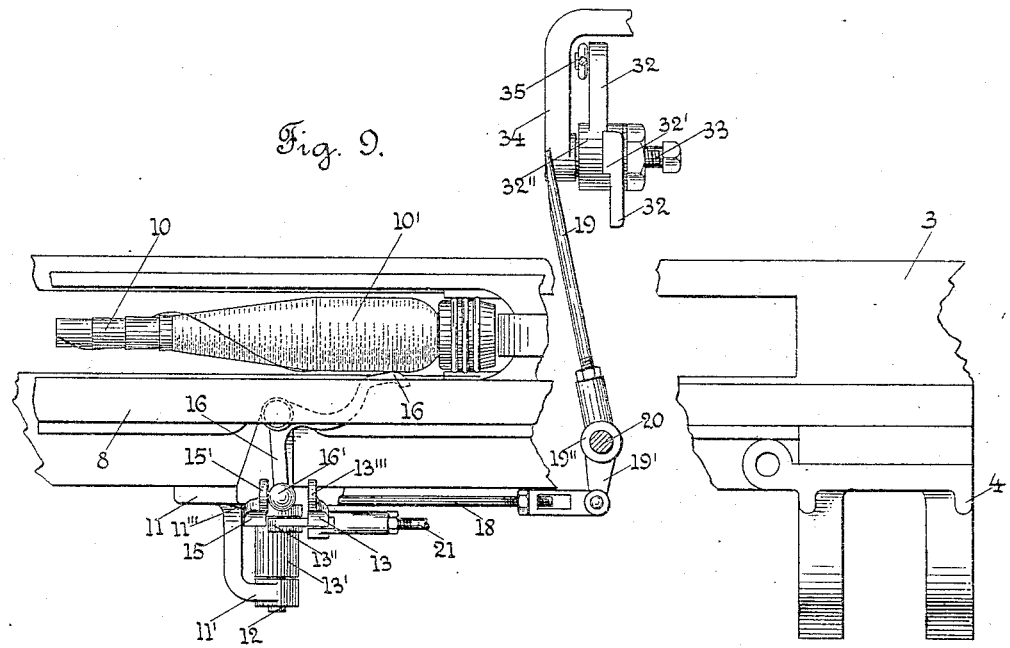

L. B. JENCKES & G. F. HUTCHINS.
WEFT REPLENISHING LOOM.
APPLICATION FILED MAY 29, 1908.

932,134.

Patented Aug. 24, 1909.
5 SHEETS—SHEET 5.

Witnesses
M. Bredt.
M. Haas.

Inventors
George F. Hutchins,
Lawrence B. Jenckes.
By John C. Dewey, Attorney.

UNITED STATES PATENT OFFICE.

LAWRENCE B. JENCKES AND GEORGE F. HUTCHINS, OF WORCESTER, MASSACHUSETTS, ASSIGNORS TO CROMPTON & KNOWLES LOOM WORKS, A CORPORATION OF MASSACHUSETTS.

WEFT-REPLENISHING LOOM.

932,134.   Specification of Letters Patent.   Patented Aug. 24, 1909.

Application filed May 29, 1908. Serial No. 435,701.

*To all whom it may concern:*

Be it known that we, LAWRENCE B. JENCKES and GEORGE F. HUTCHINS, citizens of the United States, both residing at Worcester, in the county of Worcester and State of Massachusetts, have jointly invented certain new and useful Improvements in Weft-Replenishing Looms, of which the following is a specification.

Our invention relates to automatic weft replenishing looms, and particularly to that class of looms which have shifting or change shuttle boxes at one end of the lay, and a magazine for filling carriers at the other end of the lay, and filling detecting mechanism at the magazine end of the lay, to detect practical or substantial exhaustion of filling in the active shuttle.

The object of our invention is to improve upon the construction of automatic weft replenishing looms of the class referred to, and more particularly to provide an improved mechanical filling detecting mechanism, preferably located at the back of the lay, and having a pivotally mounted filling detector located at the back of the stationary shuttle box at the magazine end of the lay, and having its filling engaging end pass through an opening in the back of the shuttle box, and an opening in the shuttle, to engage with the filling on the bobbin in the shuttle, and through intermediate mechanism to cause the movement of a dagger carried on and moving with the lay, on the practical or substantial exhaustion of filling in the active shuttle, to cause the filling carrier releasing mechanism to be put into operation.

In our present improvements one of the important features is the operation of the dagger connected with the filling detector or feeler, which dagger puts into operation, on the substantial exhaustion of filling in the active shuttle, mechanism connected with the weft replenishing mechanism to supply fresh filling to take the place of the substantially exhausted filling in the active shuttle.

In our present improvements, the dagger referred to, is normally in its operative position, so that on the substantial exhaustion of filling in the active shuttle to a predetermined extent, the dagger does not have to be moved into its operative position, but is in this position, and ready on the forward movement of the lay to put into operation mechanism connected with the weft replenishing mechanism. If there is a sufficient amount of filling on the filling carrier in the active shuttle, the engagement of the filling detector with the filling through intermediate connections to the dagger above referred to will move said dagger out of its operative position at every other forward movement of the lay.

We have shown in the drawings in connection with our improvements, a filling detecting mechanism of the type shown and described in the pending application for a patent, Serial No. 322,680, combined with other mechanisms connected with the filling selecting mechanism and transferring mechanism, and other mechanisms shown and described in other applications for patents now pending in the Patent Office, and to be hereinafter referred to.

We have only shown in the drawings a detached portion of the magazine end of a weft replenishing loom, with our improvements applied thereto, sufficient to enable those skilled in the art, to understand the construction and operation thereof.

Figure 10:
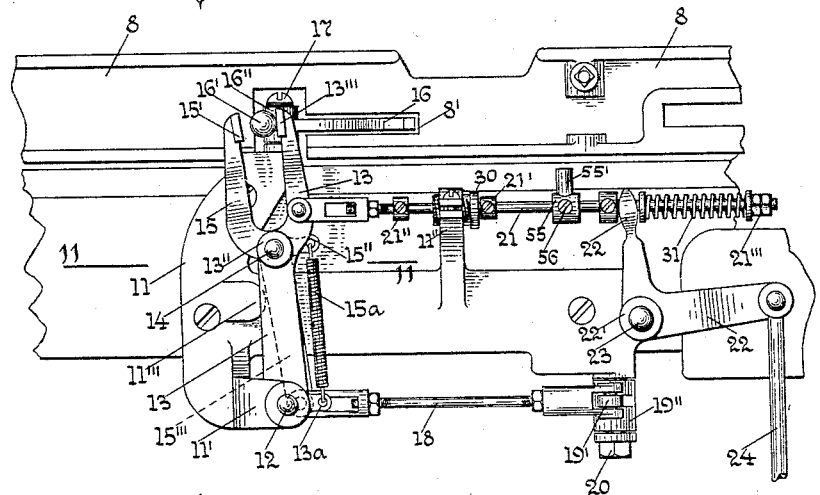
Figure 11:
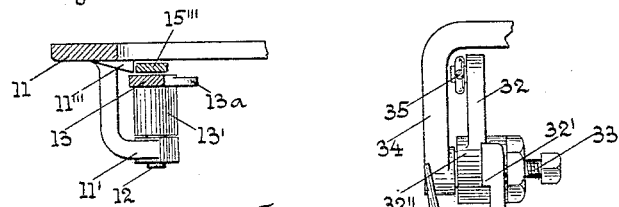

Referring to the drawings:—Figure 1 is an end view of the magazine end of a weft replenishing loom of the class referred to, with our improvements applied thereto; the magazine, the stationary shuttle box, and the lay beam are shown in section. Fig. 2 shows, on an enlarged scale, the filling detecting mechanism at the back of the lay, looking in the direction of arrow $a$, Fig. 1. Fig. 3 is a section, on line 3, 3, Fig. 2, looking in the direction of arrow $b$, same figure. Fig. 4 is a sectional plan view of the parts shown in Fig. 2, looking in the direction of arrow $b$, same figure; some of the parts are shown broken away. Fig. 5 corresponds to Fig. 4, but shows some of the parts in a different position, and also some additional parts. Fig. 6 is a section, on line 6, 6, Fig. 5, looking in the direction of arrow $c$, same figure. Fig. 7 is a section, on line 7, 7, Fig. 2, looking in the direction of arrow $d$, same figure. Fig. 8 corresponds to Fig. 2, but shows a different position of some of the parts. Fig. 9 corresponds to Fig. 5, but shows a different position of some of the parts, and some of the parts are left off in this figure. Fig. 10 corresponds to Fig. 8, but shows a different position of some of the parts. Fig. 11 is a section, on line 11, 11, Fig. 10, looking in the direction of arrow $e$, same figure, and, Fig. 12 corresponds to Fig. 9, but shows a different position of some of the parts.

In the accompanying drawings, 1 is a part of a loom side or end frame, 2 a part of the loom arch, 3 the lay carried on the lay swords 4 which are pivotally mounted at their lower ends at 5, and operated through a connector 6 to the crank shaft 7, in the usual way. On the lay 3 is mounted a stationary shuttle box 8, containing a shuttle 9 carrying a bobbin 10 having filling 10' thereon. All of the above mentioned parts may be of the usual and well known construction.

At the rear of the lay 3, back of the shuttle box 8, is in this instance secured a stand 11, having an outwardly extending arm 11' carrying a stud 12, on which in this instance is loosely mounted the hub 13' on the lower end of an upright lever 13. Near the middle portion of the upright lever 13 is a boss 13'', carrying a stud 14, which has loosely mounted thereon a second upright lever 15. The upper part of the lever 15, and the upper part of the lever 13 are offset to form a yoke-shaped lever, having in this instance the enlarged engaging ends 13''' and 15', between which extends in this instance the ball-shaped end 16' on one arm of an angle-shaped filling detector 16, which has a boss 16'' pivotally mounted on a stud 17 on the stand 11.

A helically coiled contraction spring 15ª is attached at one end to an extension 15'' on the lever 15, and at its other end to a lug 13ª extending out from the lever 13. The spring 15ª acts to hold the enlarged end 15' on the arm 15 in engagement with the head 16' on the lever 16. The other arm of the filling detector 16 enters through an opening 8' in the back of the shuttle box 8, and an opening 9'' in the back of the shuttle 9, to engage the filling 10' on the bobbin 10, and detect practical or substantial exhaustion of filling on the bobbin, in the same manner as shown and described in my said application for Letters Patent, Serial No. 322,680.

The downwardly extending arm 15''' of the lever 15 has its lower end practically in horizontal alinement with the fulcrum of the hub 13' of the lever 13, see Figs. 2 and 3, and is connected through an adjustable rod or link 18 with an extension 19' on the hub 19'' of a dagger 19. The hub 19'' of the dagger 19 is pivotally mounted on a stud 20, see Fig. 2, on the stand 11.

Figure 12:
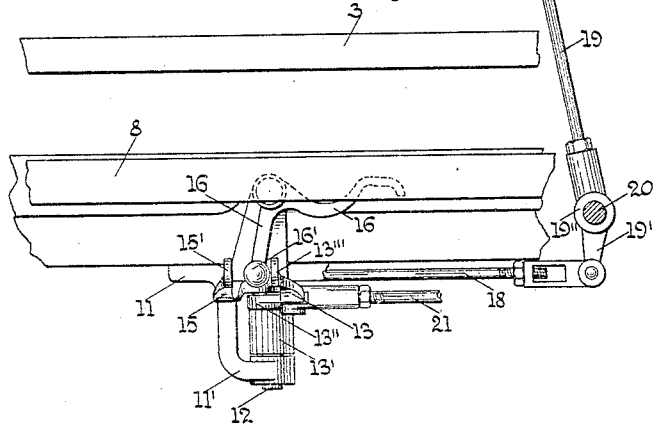

The upper part of the lever 13 is connected through a rod or connector 21 with one arm of an angle lever 22 which has the hub 22' loosely mounted on a stud 23 on the stand 11, see Fig. 2. The other arm of the angle lever 22 is pivotally connected with the upper end of a vertically moving rod 24. The lower end of said rod 24 is connected to one arm of an angle cam lever 25, see Fig. 1, which is pivotally mounted on a stud 26 on a stand 27 secured to the loom side. The other arm of the angle cam lever 25 in this instance engages the periphery of the cam 28 fast on the bottom shaft 29, and is held in engagement therewith by a spring 28'. The rotation of the cam 28, through the cam lever 25 and rod 24 to the angle lever 22, will at the proper time, positively move outwardly the lever 13, and cause the filling detector 16, by the engagement of the end 13''' of the lever 13 with the end 16' of the filling detector 16, to be positively moved away from the shuttle, as shown in Figs. 10, and 12. At the same time, the lever 15, fulcrumed on the lever 13, will be moved outwardly with said lever 13, until it engages below its fulcrum point with a projection 11''' on the stand 11, the engagement of the lever 15 below its fulcrum point with said projection 11''', causes the lower end 15''' of said lever 15, to be moved inwardly, and through the rod 18, the dagger 19 at its engaging end is moved outwardly, as shown in Fig. 12, and out of its operative position. This operation occurs at every other pick of the loom, while the shuttle is at the opposite end of the loom.

The connector 21 has two collars 21' and 21'' adjustable thereon, which are adapted to engage with a bushing 30 which is adjustably threaded into an arm 11'' of the stand 11, see Figs. 2 and 4. Said collars 21' and 21'' limit the longitudinal movement of the levers 13 and 15.

A helically coiled expansion spring 31 mounted on the connector 21, and adjustably held at its outer end by two nuts 21''' on the connector 21, and engaging at its inner end one arm of the angle lever 22, acts as a give-way for said lever.

In case the filling 10' on the bobbin 10 is practically or substantially exhausted, as shown in Fig. 4, the movement of the angle lever 22, through the connector 21 and levers 13 and 15, will rock the filling detector 16 and cause it to move into the shuttle box and shuttle, and touch the bobbin, and as there is no movement of the lower end 15'' of the lever 15, the dagger 19 connected with said end 15''' through the connector 18, will remain in the position shown, and at the forward movement of the lay, as shown in Fig. 1, the end of the dagger 19 will engage the upright arm of an angle lever 32, see Fig. 5; said lever 32 is provided at its upper end in this instance with a slight offset 32' with which the engaging end of the dagger 19 is adapted to engage to move said lever 32. A very slight movement of the dagger 19 to the left, Fig. 5, will be sufficient to allow said dagger to pass by said lever 32 and leave said lever at rest.

As long as there is a substantial amount of filling 10' on the bobbin 10 the engagement of the filling detector 16 with the filling, will hold the filling detector away from the bobbin and will cause the outer end of the filling detector having the ball 16' thereon, to bear against and move the upper end 15' of the lever 15 toward the inner end of the lay, and likewise cause the lower end 15''' of said lever 15 to be moved outwardly, and through the connector 18 attached to the dagger 19 cause said dagger to be moved to the left in Fig. 9, so that the engaging end thereof will not be in position to engage the plate 32' on the lever 32, but will pass by said plate 32', and leave said lever at rest, see Figs. 8 and 9.

The lever 32 has a hub 32'' which is loosely mounted on a stud 33 on a stand 34 attached to the loom side, see Fig. 1. The other arm of the angle lever 32 has pivotally attached thereto the lower end of a vertically extending wire or rod 35. The upper end of the rod 35 is guidingly held in an extension 36' on a swinging frame 36 having hubs or bosses 36'' thereon loosely mounted on a longitudinally sliding rod 37. The longitudinal movement of the rod 37, in connection with the swinging frame 36 is controlled in this instance through a lever 38 and a connection 39 to a pattern surface, not shown, located at the opposite end of the loom. This mechanism is fully shown and described in a pending application in the Patent Office, Serial No. 415,629.

A helically coiled contraction spring 40, attached at one end to the lever 38, and at its other end to a stationary part of the loom, not shown, acts to yieldingly hold the lever 38 and move the rod 37 in one direction.

The magazine 41 suitably supported, is in this instance of the stationary type and has two vertically extending compartments or guide-ways 41' therein for two sets or series of bobbins 10. At the lower end of each compartment 41' is located a rocking support or cradle 42 to support and release the bobbins 10, as they may be selected by a pattern surface, according to the longitudinal movement of the rod 37 and the swinging frame 36, to bring the upper hooked end of the upright rod 35 operated by the angle lever 32 and the dagger 19, as above described, over an arm 43 or an arm 44, connected with the rocking supports or cradles 42, to cause the downward movement of said rod 35, through the engagement of the dagger 19 with the angle lever 32, and through the engagement of said rod with the arm 43, cause the rocking of the support or cradle 42 to allow the lowest bobbin to drop down to be supported by said cradle, as shown at the right in Fig. 1, and at the next forward movement of the lay, in case there is no change of shuttle boxes at the shifting shuttle box end of the loom, said bobbin 10 will be dropped to the discharging end of the magazine, and the transferrer arm 45 of the transferring mechanism, through the engagement of the bunter 46 on the lay, with the latch 47 on the transferrer arm 45, will be operated to transfer a bobbin from the magazine into the shuttle, as fully described in said application for a patent, Serial No. 415,629.

The operation of the transferring mechanism, through a connector or wire 48 to the lever or arm 49, see Fig. 1, will move down said arm and cause it to engage an arm 50, see Fig. 2, on a hub or sleeve 50' on an upright stud 51 at the inner end of the shuttle box and rotate said hub, and cause an arm 52 on the lower end thereof to be moved inwardly to engage the inner end of the shuttle, see Fig. 5, to position the shuttle in the shuttle box; said shuttle positioning device is shown and described in a pending application in the Patent Office, Serial No. 342,224.

The movement of the arm 52 causes it to engage one arm of an angle lever 53 having the hub 53' pivotally mounted on a stud 54 at the rear of the shuttle box. The other arm of the angle lever 53 has a downwardly extending end 53'', see Fig. 6, which extends in the path of and is adapted to engage a pin 55' on a collar 55 adjustably secured by a screw 56 on the connector rod 21, to cause the movement of the connector rod 21 and the lever 13, to the left Fig. 2, and the consequent movement of the filling detector 16, to positively move its filling engaging end away from the bobbin 10, and out of the shuttle, as shown in Fig. 5, to allow the removal of the bobbin from the shuttle by the transferring mechanism.

It will be understood that the details of construction of our improvements may be varied if desired.

Having thus described our invention, what we claim as new and desire to secure by Letters Patent is:

1. In a weft replenishing loom with a magazine at one end, a filling detector mechanism at the magazine end of the loom to detect substantial exhaustion of filling in the active shuttle, comprising a filling detector carried on the lay to engage with the filling in the shuttle, intermediate connections from said filling detector to a dagger carried on the lay, and said dagger, normally in its operative position to put into operation mechanism connected with the weft replenishing mechanism on the substantial exhaustion of filling in the active shuttle.

2. In a weft replenishing loom with a magazine at one end, a filling detector mechanism at the magazine end of the loom to detect substantial exhaustion of filling in the active shuttle, comprising a filling detector carried on the lay and located at the back of the stationary shuttle box, with its filling engaging end adapted to pass through an opening in the back of the shuttle box and in the back of the shuttle, to engage with the filling in the shuttle, intermediate connections from said filling detector to a dagger carried on the lay, and said dagger, normally in its operative position to put into operation mechanism connected with the weft replenishing mechanism on the substantial exhaustion of filling in the active shuttle, and means to move said dagger out of its operative position, on the pick when the shuttle is at the opposite end of the loom.

3. In a weft replenishing loom with a magazine at one end, a filling detector mechanism at the magazine end of the loom to detect substantial exhaustion of filling in the active shuttle, comprising a filling detector carried on the lay and located at the back of the stationary shuttle box, with its filling engaging end adapted to pass through an opening in the back of the shuttle box and in the back of the shuttle, to engage with the filling in the shuttle, a pivoted lever with one end adapted to engage said filling detector, a longitudinally moving rod connected with said lever, adjustable stops on said rod to limit the longitudinal movement thereof, a give-way spring on said rod, connections intermediate said rod and a driven cam, to move said rod, a second lever pivoted on said first mentioned lever with one end adapted to engage the filling detector, and its other end connected with a dagger pivotally mounted on the lay to move with the lay, and said dagger, normally in its operative position ready to put into operation mechanism connected with the weft replenishing mechanism on the substantial exhaustion of filling in the active shuttle.

4. In a weft replenishing loom with a magazine at one end, a filling detector mechanism at the magazine end of the loom to detect substantial exhaustion of filling in the active shuttle, comprising a filling detector carried on the lay and located at the back of the stationary shuttle box, with its filling engaging end adapted to pass through an opening in the back of the shuttle box and in the back of the shuttle, to engage with the filling in the shuttle, intermediate connections from said filling detector to a dagger carried on the lay, and said dagger, normally in its operative position ready to put into operation mechanism connected with the weft replenishing mechanism, on the substantial exhaustion of filling in the active shuttle, and means for positively moving the filling detector away from the bobbin on the substantial exhaustion of filling, to allow the removal of the bobbin from the shuttle by the transferring mechanism.

5. In a weft replenishing loom with a magazine at one end, a filling detector at the magazine end of the loom, carried on the lay, and adapted to feel into the shuttle to detect substantial exhaustion of filling in the active shuttle, connections intermediate said filling detector and a dagger carried on and movable with the lay, and said dagger, normally in its operative position to engage a device connected with the weft replenishing mechanism and operate said device on the substantial exhaustion of filling in the active shuttle, and moved out of its normal operative position at every other pick of the lay, through the engagement of the filling detector with the filling in the active shuttle prior to substantial exhaustion of filling in said shuttle.

6. In a weft replenishing loom with a magazine at one end, a filling detector at the magazine end of the loom, carried on the lay and adapted to feel into the shuttle to detect substantial exhaustion of filling in the active shuttle, connections intermediate said filling detector and a dagger carried on and movable with the lay, and said dagger, normally in its operative position to engage a device connected with the weft replenishing mechanism and operate said device on the substantial exhaustion of filling in the active shuttle, and moved out of its normal operative position at every other pick of the lay, through the engagement of the filling in the active shuttle, prior to substantial exhaustion of filling in said shuttle, and means for positioning the shuttle in the shuttle box at the magazine end of the loom.

7. In a weft replenishing loom with a magazine at one end, a filling detector at the magazine end of the loom, carried on the lay, and adapted to feel into the shuttle to detect substantial exhaustion of filling in the active shuttle, connections intermediate said filling detector and a dagger carried on and movable with the lay, and said dagger, normally in its operative position to engage a device connected with the weft replenishing mechanism and operate said device on the substantial exhaustion of filling in the active shuttle, and moved out of its normal operative position at every other pick of the lay through the engagement of the filling detector with the filling in the active shuttle prior to substantial exhaustion of filling in said shuttle, and means for positioning the shuttle in the shuttle box at the magazine end of the loom, and means for positively moving the filling detector away from the shuttle, preparatory to the operation of the transferring mechanism.

LAWRENCE B. JENCKES.
GEORGE F. HUTCHINS.

Witnesses:
JOHN C. DEWEY,
MINNA HAAS.